United States Patent
Chung et al.

(10) Patent No.: US 6,252,735 B1
(45) Date of Patent: Jun. 26, 2001

(54) VOLTAGE-BIASING, VOLTAGE-SENSING DIFFERENTIAL PREAMPLIFIER FOR MAGNETORESISTIVE ELEMENTS

(75) Inventors: Paul Wingshung Chung, San Jose; Stephen Alan Jove, Watsonville, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/258,022

(22) Filed: Feb. 25, 1999

(51) Int. Cl.[7] ....................................... G11B 5/02
(52) U.S. Cl. ........................... 360/67; 360/46; 360/66
(58) Field of Search .............................. 360/66, 67, 46

(56) References Cited

U.S. PATENT DOCUMENTS

| | | | |
|---|---|---|---|
| 4,786,993 | 11/1988 | Jove et al. | 360/67 |
| 4,879,610 | 11/1989 | Jove et al. | 360/67 |
| 5,103,353 * | 4/1992 | Jove et al. | 360/67 |
| 5,204,789 | 4/1993 | Jove et al. | 360/67 |
| 5,309,295 | 5/1994 | Baily et al. | 360/66 |
| 5,444,579 | 8/1995 | Klein et al. | 360/67 |
| 5,633,765 | 5/1997 | Lin et al. | 360/46 |
| 5,701,213 | 12/1997 | Cameron et al. | 360/66 |
| 5,717,536 | 2/1998 | Jung et al. | 360/67 |
| 5,737,157 | 4/1998 | Gill et al. | 360/113 |
| 5,770,968 | 6/1998 | Cameron | 327/538 |

* cited by examiner

Primary Examiner—David Hudspeth
Assistant Examiner—Dan I. Davidson
(74) Attorney, Agent, or Firm—Noreen A. Krall; Ron Feece

(57) ABSTRACT

A voltage-biasing, voltage-sensing differential preamplifier having a high input impedance preamplifier circuit to amplify magnetic data readback signals from a magnetoresistive (MR) sensor and feedback circuits to simultaneously hold the electrical center of the MR sensor at a prescribed potential (usually ground) while applying a predetermined constant differential voltage-bias across the MR element. The feedback circuits provide a stable operating point for the MR sensor at the desired bias-voltage, and maintain the average potential on the MR sensor at or near the disk substrate potential to limit the destructive effects of MR sensor contact with conducting asperities.

7 Claims, 8 Drawing Sheets

VOLTAGE-BIASING, VOLTAGE-SENSING DIFFERENTIAL PREAMPLIFIER FOR MAGNETORESISTIVE ELEMENTS

BACKGROUND OF THE INVENTION

1. Field of the Invention

This invention relates in general to a direct access storage device (DASD) of the type utilizing magnetoresistive read sensors for reading signals recorded in a magnetic medium and, more particularly, to a DASD having a novel voltage-biasing, voltage-sensing differential preamplifier for improving the high frequency bandwidth amplification of the read signal channel and providing protection of the magnetoresistive read sensor from damage due to interaction with conductive asperities.

2. Description of Related Art

Moving magnetic storage devices, especially magnetic disk drives, are the memory devices of choice. This is due to their expanded non-volatile memory storage capability combined with a relatively low cost.

Magnetic disk drives are information storage devices which utilize at least one rotatable magnetic media disk having concentric data tracks defined for storing data, a magnetic recording head or transducer for reading data from and/or writing data to the various data tracks, a slider for supporting the transducer in proximity to the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air-bearing, generated by the rotating disk.

Alternatively, the transducer may operate in contact with the surface of the disk. Thus, the suspension provides desired slider loading and dimensional stability between the slider and an actuator arm which couples the transducer/slider/suspension assembly to the actuator. The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks. The actuator may include a single arm extending from a pivot point, or alternatively a plurality of arms arranged in a comb-like fashion extending from a pivot point. A rotary voice coil motor (vcm) is attached to the rear portion of the actuator arm or arms to power movement of the actuator over the disks.

The vcm located at the rear portion of the actuator arm is comprised of a top plate spaced above a bottom plate with a magnet or pair of magnets therebetween. The vcm further includes an electrically conductive coil disposed within the rearward extension of the actuator arm and between the top and bottom plates, while overlying the magnet in a plane parallel to the magnet. In operation, current passes through the coil and interacts with the magnetic field of the magnet so as to rotate the actuator arm around its pivot and thus positioning the transducer as desired.

The magnetic media disk or disks in the disk drive are mounted to a spindle. The spindle is attached to a spindle motor which rotates the spindle and the disks to provide read/write access to the various portions on the concentric tracks on the disks.

One or more electrical conductors extend over the suspension assembly to electrically connect the read/write transducer to a read/write chip on the actuator arm. A multi line flexible printed circuit cable (actuator flex cable) provides the electrical contact between the read/write chip and the disk drive electronics which are mounted outside the disk drive housing. Inside the disk drive housing, the actuator flex cable connects to an electrical connector pin assembly, which in turn, through an opening or connector port in the housing, connects to the external electronics.

In high capacity disk drives, magnetoresistive read sensors, commonly referred to as MR heads are the prevailing read sensor because of their capability to read data from a surface of a disk at greater track and linear densities than thin film inductive heads. An MR sensor detects a magnetic field through the change in resistance of its MR sensing layer (also referred to as an "MR element") as a function of the strength and direction of the magnetic flux being sensed by the MR layer.

The changes in resistance of the MR element in response to magnetic data recorded on a disk surface is amplified in the read/write chip (also referred to as the arm electronics (AE) module) on the actuator arm before transmission to the external electronics. The frequency response of the preamplifier in the AE module, and in particular its high frequency bandwidth determines the data rate capability of the disk drive. The high frequency bandwidth of the system comprising the MR element, preamplifier and interconnects is a function of the MR element resistance. MR element resistances generally have a range of values due to manufacturing variations and tolerances. The resistance of a single MR element may also change due to temperature or other conditions in the disk drive during manufacturing and use.

The MR element is known to be sensitive to and easily damaged by contacts with conductive asperities on the surface of the disk. Momentary contact of the MR element with a conductive asperity can result in transitory current flow through the MR element causing damage or destruction of the MR element. Prior differential amplifiers have applied a predetermined constant current-bias to the MR element to provide protection for the MR element. IBM's U.S. Pat. No. 4,879,610 to Jove et al., describes a protective circuit for a current-bias differential preamplifier.

A low-noise voltage-biasing differential preamplifier for MR elements is described in IBM's U.S. Pat. No. 5,204,789 to Jove et al. This prior art preamplifier only taught current-sensing of a signal produced by an MR element. Due to the relatively low values of the resistances of present and future MR elements, coupled with relatively high values of parasitic series inductance in the wiring connecting the MR element to the preamplifier, current-sensing is no longer advantageous because it would not yield higher bandwidth amplification. A further disadvantage of voltage-biasing with current-sensing is that amplitude over-equalization occurs ($dR/R^2$) instead of the preferred $dR/R$ amplitude equalization. Amplitude equalization techniques for systems using MR sensors are further discussed in IBM's U.S. Pat. No. 5,032,935 to Jove et al.

Therefore, it can be seen that there is need for a voltage-biasing, voltage-sensing differential preamplifier for MR elements that provides higher bandwidth amplification and provides protection from the destructive effects of contact with conductive asperities.

SUMMARY OF THE INVENTION

It is an object of the present invention to disclose a voltage-biasing, voltage-sensing differential preamplifier for a disk drive storage device by providing improved high frequency bandwidth amplification of MR element magnetic readback signals.

It is another object of the present invention to disclose a voltage-biasing, voltage-sensing differential preamplifier for providing protection for an MR element from electrical damage due to interaction with a conductive asperity.

It is a further object of the present invention to disclose a voltage-biasing, voltage-sensing differential preamplifier that minimizes error signals of the average voltage on an MR element and the differential bias voltage across an MR head to provide a stable operating point and to minimize or eliminate electrical damage due to interaction with conducting asperities.

These and other objects and advantages are attained in accordance with the principles of the present invention by a voltage-biasing, voltage-sensing differential preamplifier comprising a first subcircuit having a high input impedance preamplifier circuit to amplify magnetic readback data signals to a level usable by the remaining data channel, and a second subcircuit to simultaneously hold the electrical center of the MR element at a prescribed potential (usually ground) while applying a predetermined constant differential voltage-bias across the MR element.

The second subcircuit comprises a first feedback circuit including an average-voltage amplifier, and a second feedback circuit comprising a differential voltage amplifier, a differential reference amplifier, a summing circuit, a converter circuit, and first and second controlled current sources. The first feedback circuit comprising the average-voltage amplifier and its associated circuitry provides a first error signal measuring the difference of the actual average potential on the MR element and a desired average potential. The second feedback circuit provides a second error signal measuring the difference between the actual differential bias-voltage across the MR element and a desired bias-voltage. The first and second error signals are minimized in the first and second feedback loops of the average-voltage circuitry and the differential bias-voltage circuitry, respectively, to provide a stable operating point for the MR sensor at the desired bias-voltage while maintaining the average potential on the MR sensor at or near the disk substrate potential (usually ground) to limit the destructive effects of contact with conducting asperities.

The above as well as additional objects, features, and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 1:
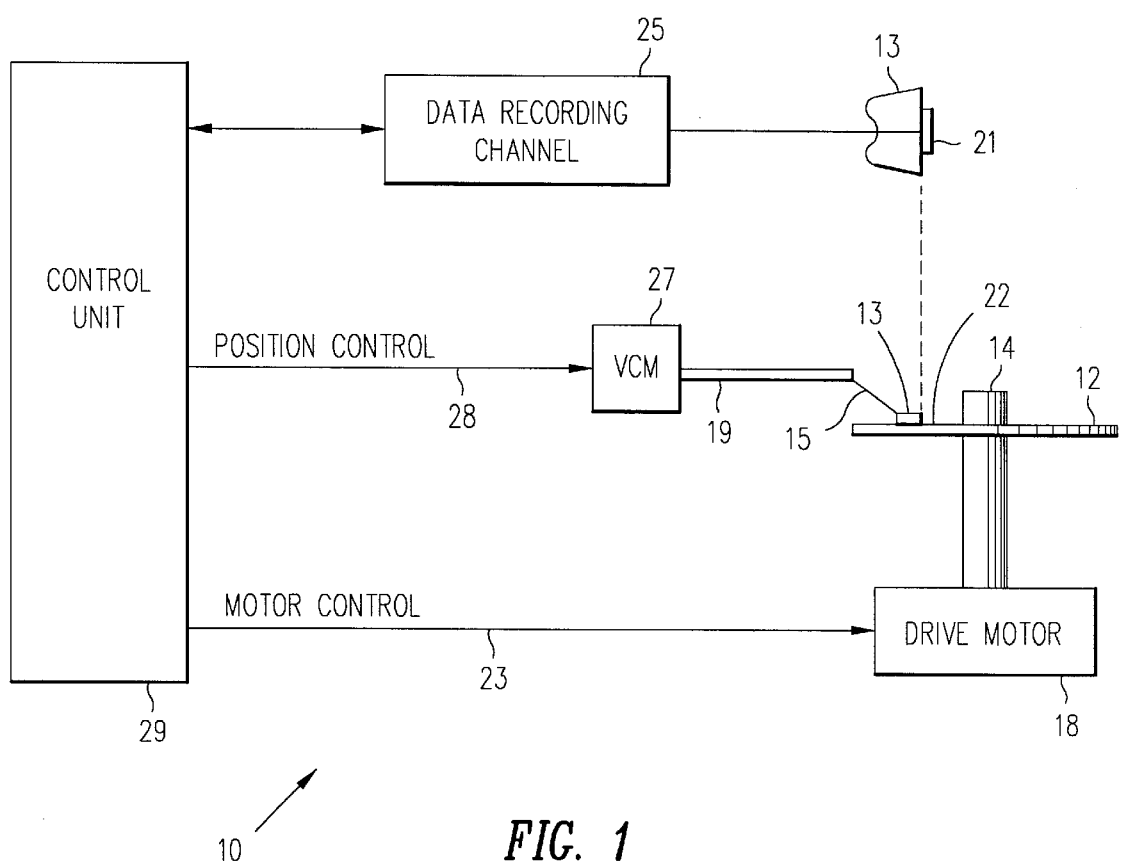
FIG. 1 is a simplified perspective drawing of a magnetic recording disk drive system which incorporates the present invention.

Referring now to FIG. 1, there is shown a disk drive 10 embodying the present invention. As shown in FIG. 1, at least one rotatable magnetic disk 12 is supported on a spindle 14 and rotated by a disk drive motor 18. The magnetic recording media on each disk is in the form of an annular pattern of concentric data tracks (not shown) on the disk 12.

At least one slider 13 is positioned on the disk 12, each slider 13 supporting one or more magnetic read/write heads 21. As the disks rotate, the slider 13 is moved radially in and out over the disk surface 22 so that the heads 21 may access different portions of the disk where desired data is recorded. Each slider 13 is attached to an actuator arm 19 by means of a suspension 15. The suspension 15 provides a slight spring force which biases the slider 13 against the disk surface 22. Each actuator arm 19 is attached to an actuator 27. The actuator as shown in FIG. 1 may be a voice coil motor (VCM). The VCM comprises a coil movable within a fixed magnetic field, the direction and speed of the coil movements being controlled by the motor current signals supplied by a controller 29.

During operation of the disk storage system, the rotation of the disk 12 generates an air bearing between the slider 13 (the surface of the slider 13 which includes the head 21 and faces the surface of the disk 12 is referred to as an air bearing surface (ABS)) and the disk surface 22 which exerts an upward force or lift on the slider. The air bearing thus counter-balances the slight spring force of the suspension 15 and supports the slider 13 off and slightly above the disk surface by a small, substantially constant spacing during normal operation.

The various components of the disk storage system are controlled in operation by control signals generated by the control unit 29, such as access control signals and internal clock signals. Typically, the control unit 29 comprises logic control circuits, storage chips and a microprocessor. The control unit 29 generates control signals to control various system operations such as drive motor control signals on line 23 and head position and seek control signals on line 28. The control signals on line 28 provide the desired current profiles to optimally move and position the slider 13 to the desired data track on the disk 12. Read and write signals are communicated to and from the read/write heads 21 by the recording channel 25. Recording channel 25 may be a partial response maximum likelihood (PMRL) channel or a peak detect channel. The design and implementation of both channels are well known in the art and to persons skilled in the art. In the preferred embodiment, recording channel 25 is a PMRL channel.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
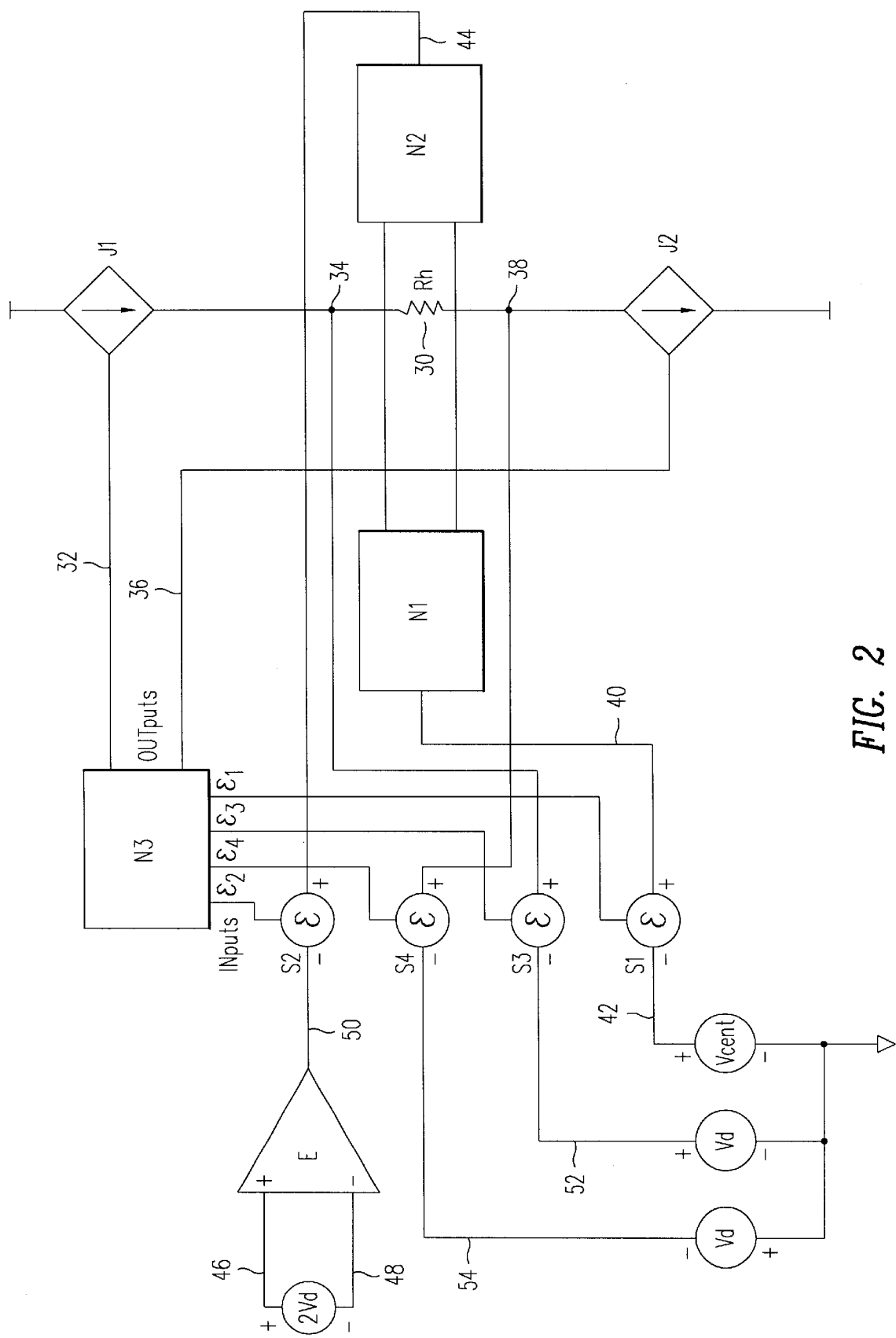
FIG. 2 is a block diagram of a generalized voltage-biasing, voltage-sensing differential preamplifier in accordance with the present invention.

Reference is now made to FIG. 2, which shows a block diagram of a generalized voltage-biasing, voltage-sensing differential preamplifier that may be located in the data recording channel 25. An MR element 30 is shown as a resistor $R_h$. A first controlled current source $J_1$ having a control input from a network $N_3$ on line 32 forces a current into the positive terminal of the MR element 30 at node 34. A second controlled current source $J_2$ having a control input from the network $N_3$ on line 36 removes a current from the most negative terminal of the MR element 30 at node 38. A network $N_1$ connected across the MR element 30 produces a first signal at node 40 which represents the potential at the electrical center of the MR element 30. This signal represents the average potential of the MR element 30. A voltage source $V_{cent}$ representing a desired average potential of the MR element is applied on line 42. Summing means $S_1$ takes the difference of the signals on line 40 and line 42 to produce a first error signal $e_1$.

Network $N_2$ connected across the MR element 30 produces a second signal at node representative of the differential voltage across the MR element 30. A voltage source $2V_d$ representing the desired differential voltage on the MR element 30 is applied on lines 46 and 48 to an operational amplifier E which converts this differential voltage to a single-ended signal on line 50. Summing means $S_2$ takes the difference of the signals on line 44 and line 50 to produce a second error signal $e_2$.

A third signal existing at node 34 is the most positive potential of the MR element 30, or one-half of the applied bias voltage $2V_d$ (a positive value). If the potential on line 40 were exactly zero, then the potential at node 34 would be $+V_d$ volts. A voltage reference $+V_d$ representing the desired voltage of the most positive potential of the MR element 30 is applied on line 52. Summing means $S_3$ takes the difference of the signals at node 34 and line 52 to produce a third error signal $e_3$. Similarly, a fourth signal existing at node 38 is the most negative potential of the MR element 30, or one-half of the applied bias voltage (a negative value). Again, if the potential on line 40 were exactly zero, then the potential at node 38 would be $-V_d$ volts. A voltage reference $-V_d$ representing the desired voltage of the most negative potential of the MR element 30 is applied on line 54. Summing means $S_4$ takes the difference of the signals at node 38 and line 54 to produce a fourth error signal $e_4$.

The network $N_3$ can accept as inputs any two of the four error signals $e_1$, $e_2$, $e_3$ and $e_4$. Network $N_3$ supplies control outputs to controlled current sources $J_1$ and $J_2$, on lines 32 and 36, respectively, so that current sources $J_1$ and $J_2$ provide current values (in the low frequency sense) to ensure that the proper biasing voltage is applied across the MR element 30, and that the average potential of the MR element 30 is kept at or near ground potential (to protect against damage due to contact with conductive asperities). Inherent in network $N_3$ would be appropriate dominant poles to stabilize the feedback system and prevent oscillation as is well known in the art. Both the controlled current sources $J_1$ and $J_2$ have an in-phase component $I_a$ and an out-of-phase component $I_b$ which are coupled with respect to each source. Thus, when current $J_1$ increases by $I_a$, current $J_2$ also increases by $I_a$, and when current $J_1$ increases by $I_b$, current $J_2$ decreases by $I_b$. In this manner it is possible to use only two controlled current sources to minimize two of the four error signals. In this way, one of the following six conditions can be selected and controlled:

1) $R_h$ diff. voltage & $R_h$ av. voltage by minimizing $e_2$ & $e_1$
2) $R_h$ diff. voltage & $R_h$ most +voltage by minimizing $e_2$ & $e_3$
3) $R_h$ diff. voltage & $R_h$ most −voltage by minimizing $e_2$ & $e_4$
4) $R_h$ av. voltage & $R_h$ most +voltage by minimizing $e_1$ & $e_3$
5) $R_h$ av. voltage & $R_h$ most −voltage by minimizing $e_1$ & $e_4$
6) $R_h$ most +voltage & $R_h$ most −voltage by minimizing $e_3$ & $e_4$ In the preferred embodiment of the present invention, the first error signal $e_1$ and the second error signal $e_2$ will be used to affect changes in the controlled current sources $J_1$ and $J_2$, respectively.

Alternatively, the control signal on line 32 may be used to control two controlled current sources $J_a'$ and $J_b'$, where $J_a'$ takes the place of $J_1$, and $J_b'$ takes the place of $J_2$ in the circuit of FIG. 2. Then, the control signal on line 36 would control additional controlled current sources $J_a''$ and $J_b''$, where $J_a''$ would exist in parallel to $J_a'$ and $J_b''$ would exist in parallel to $J_b'$. In this way, the controlled current source pair consisting of $J_a'$ and $J_b'$ would affect predominately one error signal, while the controlled current source pair $J_a''$ and $J_b''$ would affect predominately a second error signal. This result would be achieved if the controlled current pair $J_a'$ and $J_a''$ are connected in-phase with respect to each other, and the controlled current pair $J_b'$ and $J_b''$ are connected out-of-phase with respect to each other. No matter what the details are, the basic concept here is to use only two of the above mentioned error signals to affect changes in each one by appropriately controlling currents to and from the MR element 30.

Figure 3:
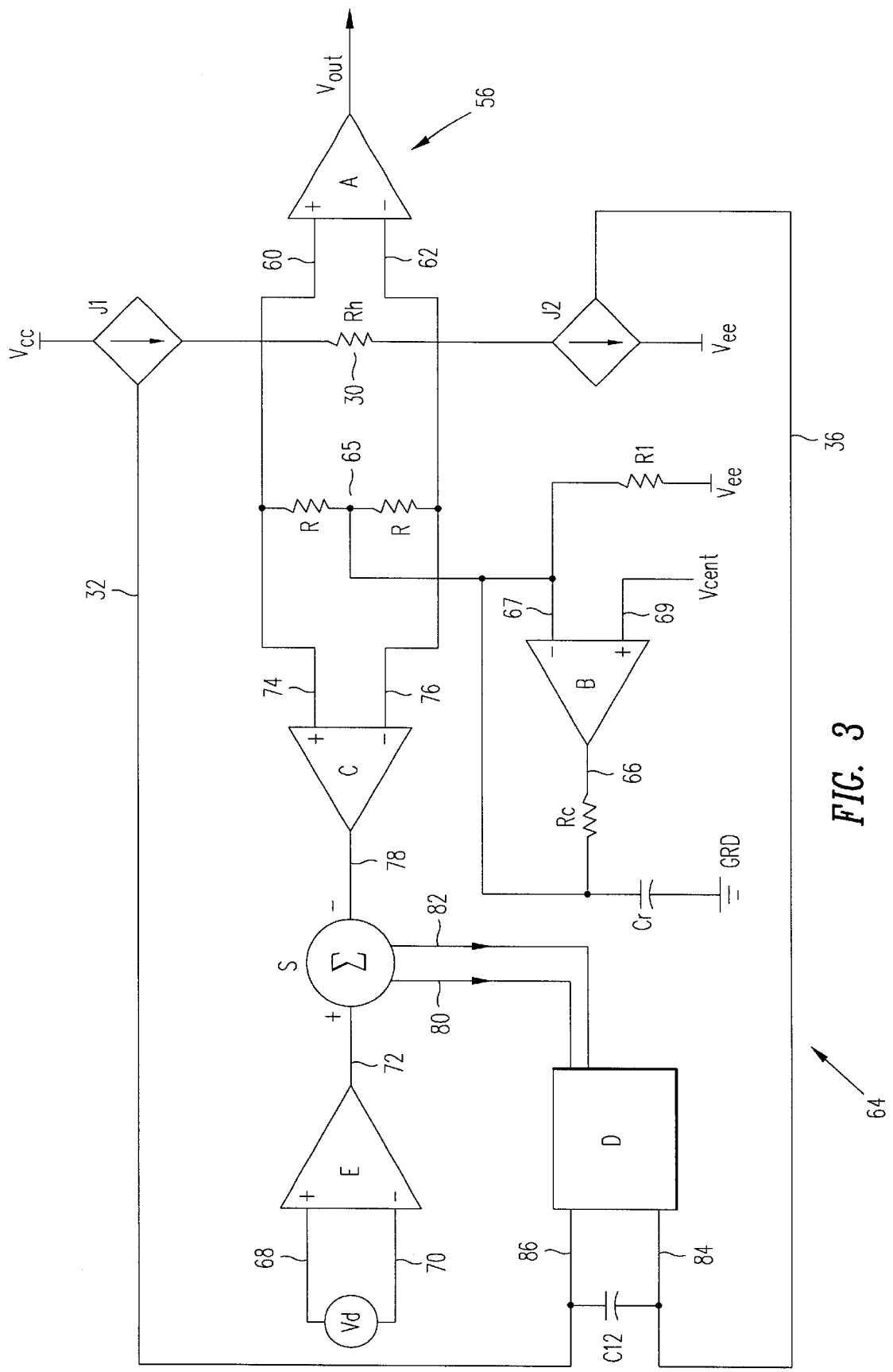
FIG. 3 is a block diagram of a voltage-biasing, voltage-sensing differential preamplifier according the preferred embodiment of the present invention.

FIG. 3 shows a block diagram of the voltage-biasing, voltage-sensing differential preamplifier according to the preferred embodiment of the present invention. The voltage-biasing, voltage-sensing differential preamplifier comprises a first subcircuit 56 to amplify magnetic readback data signals to a level useable by the remaining data channel, and a second subcircuit 58 to simultaneously hold the electrical center of the MR element 30 at a prescribed potential (usually ground) while applying a predetermined constant differential voltage bias across the MR element 30.

The first subcircuit 56 comprises a differential amplifier A having a first input 60 connected to the positive terminal of the MR element 30 at node 34 and a second input 62 connected to the negative terminal of the MR element 30 at node 38. Amplifier A includes a high pass characteristic to eliminate the large DC component due to the biasing of the MR element 30 from appearing at the output $V_{out}$. In general, amplifier A is a differential amplifier having both inputs connected to the control terminals of low noise input transistors such that the input impedance of amplifier A is relatively high. High input impedance differential amplifiers are well known to those skilled in the art. Several methods of achieving this design are described with reference to FIGS. 4, 5, and 6.

Figure 4:
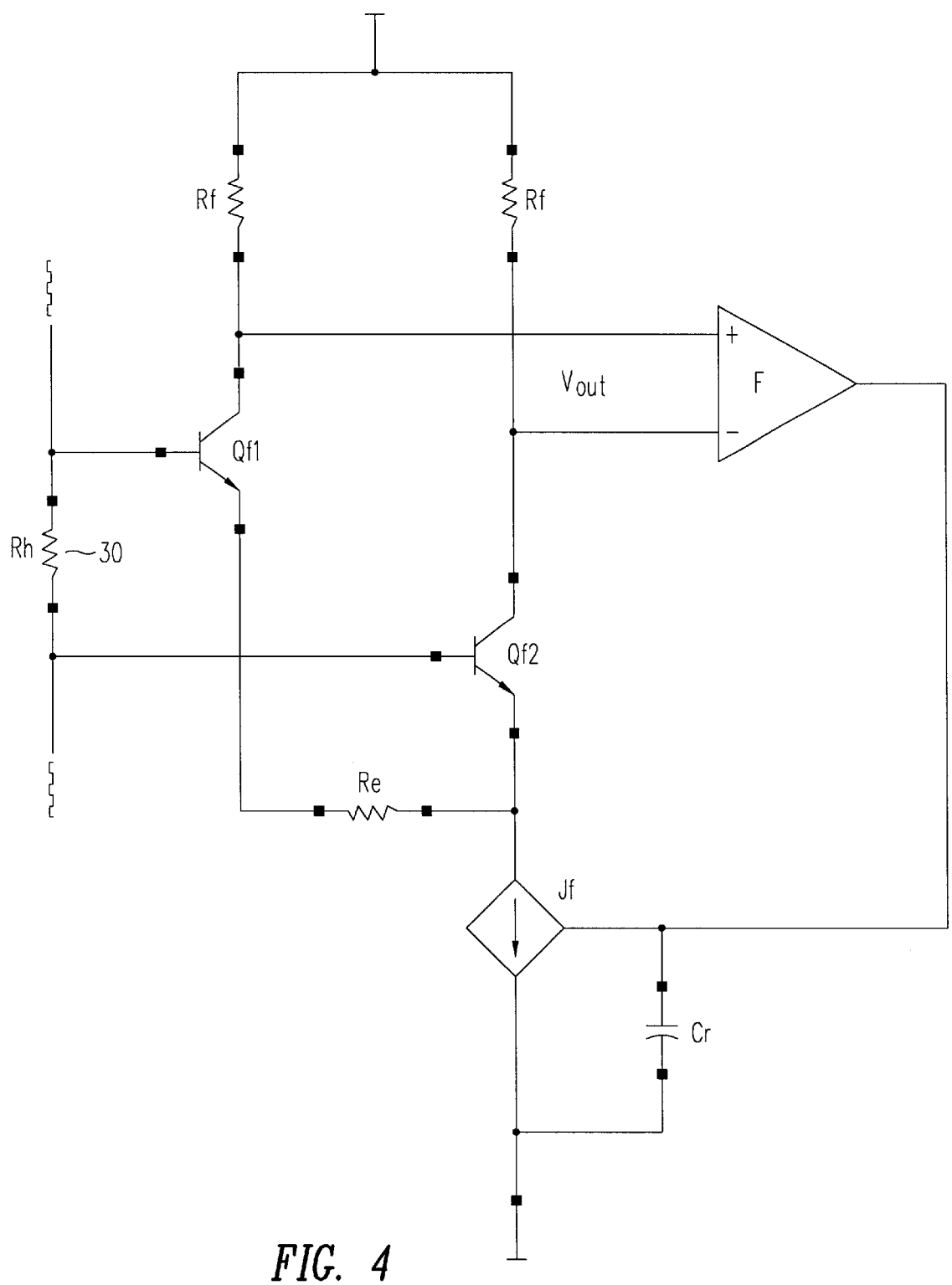
FIG. 4 is a circuit diagram of a differential preamplifier subcircuit according to an embodiment of the present invention.

FIG. 4 is a circuit diagram of a differential preamplifier subcircuit according to a first method for constructing amplifier A. Amplifier A is a differential amplifier having a relatively high input impedance such that voltage-sensing of the MR element 30 occurs. The MR element 30 produces a very small magnitude signal (approximately 1 mV) requiring amplifier A to amplify this signal by a factor usually of the order several hundred. The MR element is directly connected to the bases of differential input devices $Q_{f1}$ and $Q_{f2}$. An emitter degeneration resistor $R_e$ isolates the emitters of input devices $Q_{f1}$ and $Q_{f2}$ from each other. A variable current from a controlled current source $J_f$ in a feedback loop with a feedback amplifier F and a stabilizing capacitor $C_f$ serve to eliminate the large DC component due to MR element biasing at the output $V_{out}$. The amplified output signal $V_{out}$ is taken across collector resistors $R_{f1}$ and $R_{f2}$.

Figure 5:
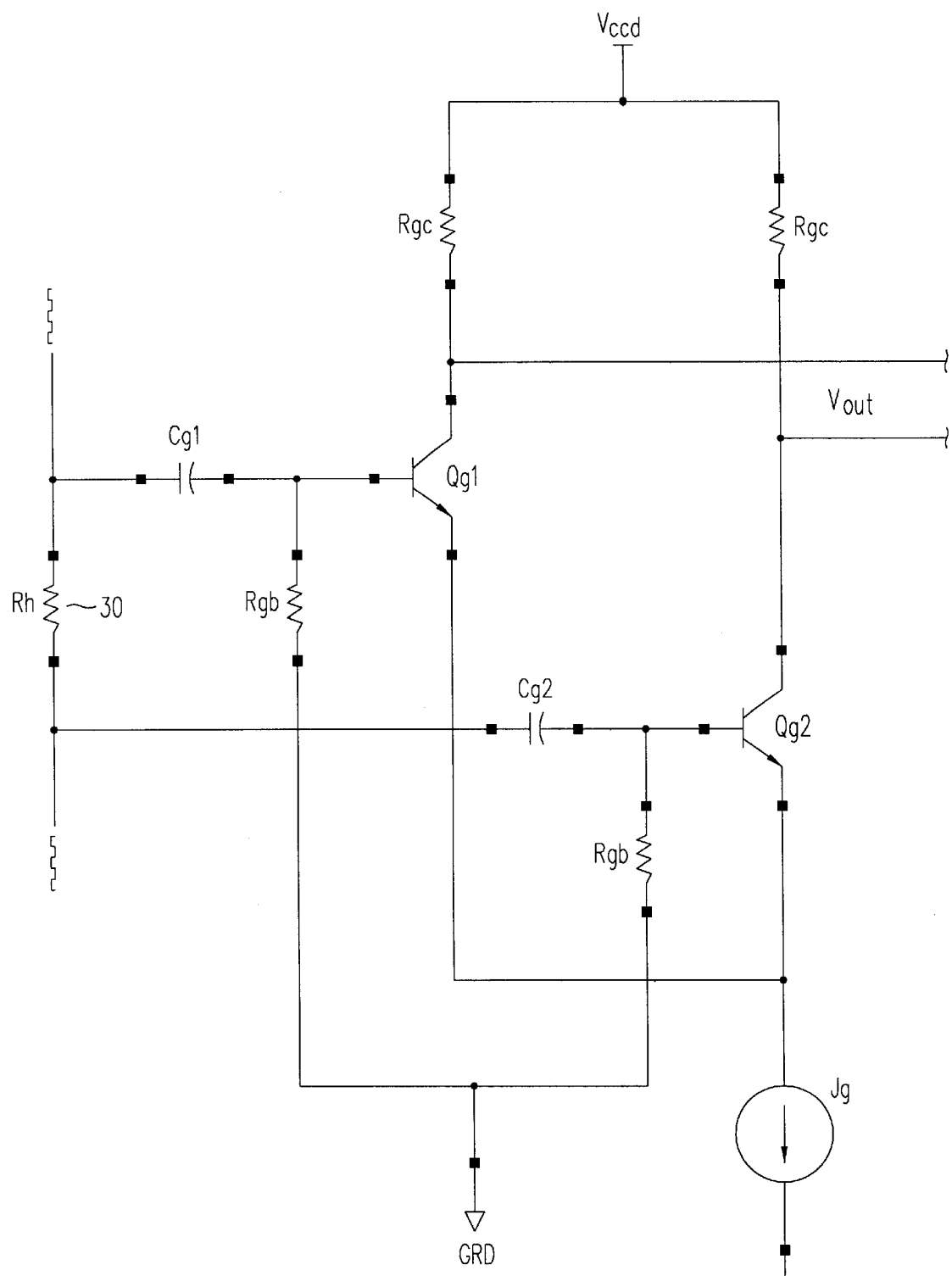
FIG. 5 is a circuit diagram of a differential preamplifier subcircuit according to a second embodiment of the present invention.

FIG. 5 is a circuit diagram of a differential preamplifier subcircuit according to a second method for constructing amplifier A. No additional feedback is needed here as in the first method shown in FIG. 4. Small series capacitors $C_{g1}$ and $C_{g2}$ in the connections to the bases of the input devices $Q_{g1}$ and $Q_{g2}$ serve to eliminate the aforementioned large DC component due to MR element biasing. Base resistors $R_{gb}$ serve to bias the bases of the input devices $Q_{g1}$ and $Q_{g2}$ when a current source $J_g$ is active. The amplified output signal $V_{out}$ is taken across collector resistors $R_{gc}$.

Figure 6:
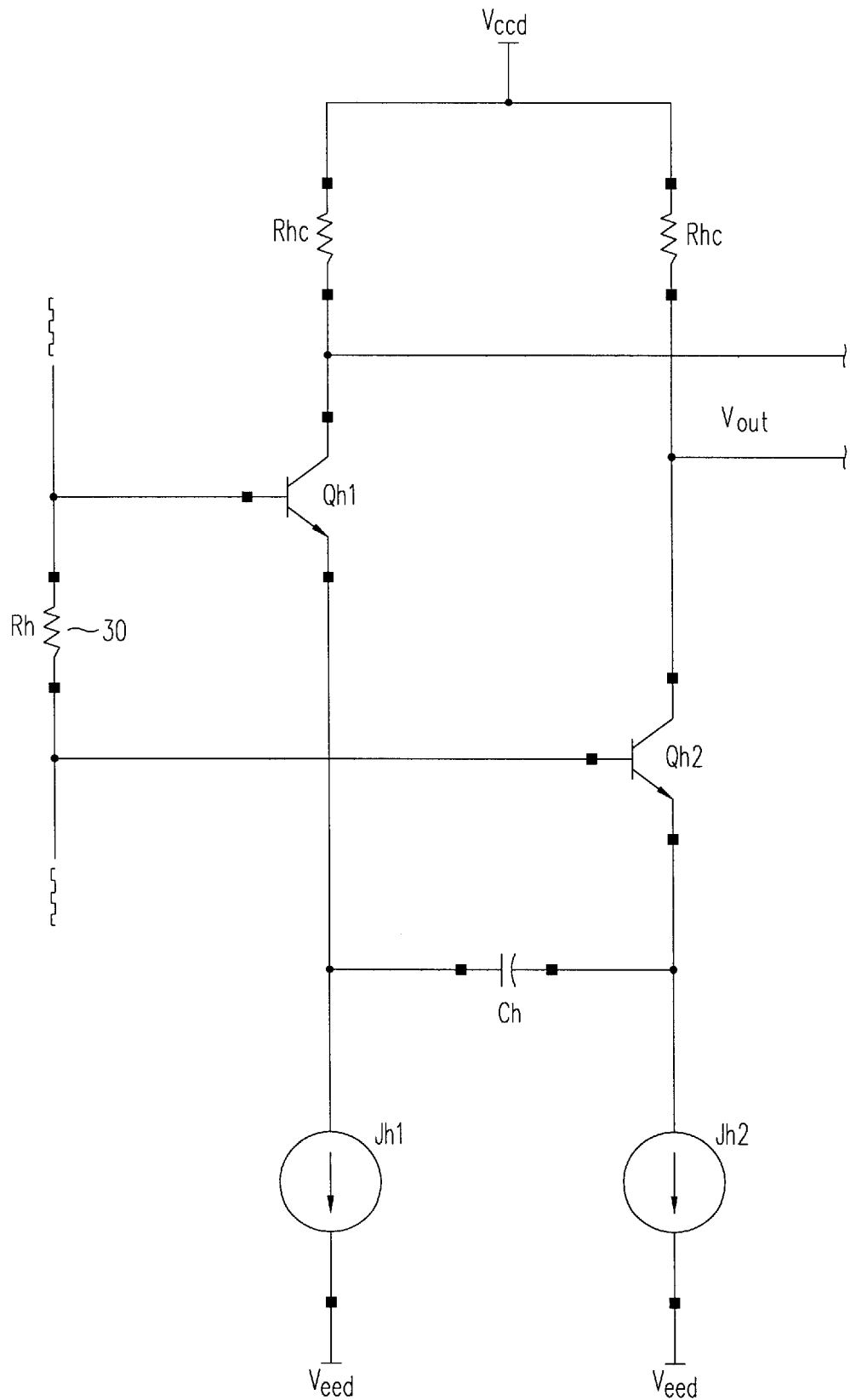
FIG. 6 is a circuit diagram of a differential preamplifier subcircuit according to a third embodiment of the present invention.

FIG. 6 is a circuit diagram of a differential preamplifier subcircuit according to a third method for constructing amplifier A. The MR element 30 is directly connected to the bases of the differential input devices $Q_{h1}$ and $Q_{h2}$ as in the first method described with reference to FIG. 4, but a relatively large (as compared to the capacitors $C_{g1}$ and $C_{g2}$ of the second method described with reference to FIG. 5) emitter decoupling capacitor $C_h$ serves to isolate the DC signal from the emitters of input devices $Q_{h1}$ and $Q_{h2}$ and to eliminate the aforementioned large DC component due to the MR element biasing at $V_{out}$. Fixed current sources $J_{h1}$ and $J_{h2}$ connected to the emitters of the input devices $Q_{h1}$ and $Q_{h2}$, respectively, bias the preamplifier into operation. The amplified output signal $V_{out}$ is taken across collector resistors $R_{hc}$.

Referring back to FIG. 3, the second subcircuit 58 comprises a first feedback circuit 63 including an average-voltage amplifier B, and a second feedback circuit 64 including a differential voltage amplifier C, a differential reference amplifier E, a summing circuit S, a converter circuit D, and first and second controlled current sources $J_1$ and $J_2$. The first feedback circuit 63 comprising amplifier B and its associated circuitry provides a first error signal $e_1$ equivalent to the first error signal discussed above with reference to FIG. 2. The second feedback circuit 64 comprising amplifier C, reference amplifier E, and summing circuit S provide a second error signal $e_2$ equivalent to the second error signal discussed above with reference to FIG. 2. The converter circuit D processes the second error signal $e_2$ to provide control signals to the first and second controlled current sources $J_1$ and $J_2$ (circuit D provides a function equivalent to network $N_3$ in FIG. 2).

The MR element ($R_h$) 30 is in a parallel connection with two series resistors R such that at node 65, the common connection node of series resistors R, the electrical center potential of the MR element 30 can be derived. A resistor $R_1$ connected between the negative input terminal 67 of amplifier B and a voltage source $V_{ee}$ also makes a connection at node 65 so that an error voltage can be obtained from error currents passing through resistor $R_1$ referred to a first reference voltage $V_{cent}$. The MR element 30 is biased directly by the controlled current sources $J_1$ and $J_2$ so as to provide a constant and predetermined voltage bias $V_{bias}$ from the positive terminal 34 to the negative terminal 38. Since it is desirable to hold node 65 at or near ground potential, the controlled current source $J_1$ will have a connection to a positive supply voltage $V_{cc}$, and controlled current source $J_2$ will have a connection to a negative supply voltage $V_{ee}$. The first reference voltage $V_{cent}$ is generated in the second subcircuit 58 and is inputted by connection at the positive input terminal 69 to the average-voltage amplifier B as the desired potential at node 65. Amplifier B is a differential transconductance amplifier which amplifies the difference between the potential at node 65 (actual center voltage of the MR element 30) and the first reference voltage $V_{cent}$ (desired center voltage of the MR element 30) providing this amplified difference at the amplifier B output at node 66. The difference between the potential at node 65 and the first reference voltage $V_{cent}$ is the first error signal $e_1$. A dominant pole is created by a series resistor $R_c$ connecting the output of amplifier B at node 66 back to node 65, and a parallel capacitor $C_r$ connected from node 65 to a ground GRD. In this way, the first feedback circuit 63 comprising the differential transconductance amplifier B is stabilized, and common mode noise is eliminated at node 65, the electrical center of the MR element 30. The first reference voltage $V_{cent}$ is preferably at ground potential to protect the MR element 30 from damage due to contact with conductive asperities on the disk, since the disk substrate is usually at ground potential.

A second reference voltage $V_d$ is also generated in the second feedback circuit 64 of the second subcircuit 58 such that the desired bias voltage for the MR element 30 is provided at the inputs 68, 70 to the differential reference amplifier E. Amplifier E (a differential transconductance amplifier) converts the differential reference voltage $V_d$ to a single-ended representation which appears at amplifier E output 72. The inputs 74 and 76 to the differential voltage amplifier C (a differential transconductance amplifier) are connected to the positive terminal 34 and the negative terminal 38, respectively, of the MR element 30. The differential voltage bias $V_{bias}$ across the MR element 30 is converted by amplifier C to a single-ended representation which appears at amplifier C output 78. The signals at amplifier E output 72 and amplifier C output 78 are subtracted by summing circuit S (a differential transconductance amplifier) which provides a difference signal across lines 80 and 82 connected to the output terminals of the summing circuit S. The difference signal from the summing circuit S is such that the signal on line 82 is in phase with, and positive for values of $V_d$ exceeding the value of $V_{bias}$. The difference signal across lines 80 and 82 is the second error signal $e_2$.

The second error signal $e_2$ appearing as the difference signal across lines 80, 82 is the input to a converter D for providing control inputs to the first and second controlled current sources $J_1$ and $J_2$. Converter D converts the signal appearing on line 80 into an in-phase signal at converter D output terminal 84. If the controlled current source J2 comprises N-type devices for removing current from the negative terminal 38 of the MR element 30, then the signal at output terminal 84 would be shifted to a level varying from $V_{ee}$ to $V_{cent}$ to allow the proper signal level into the control input of $J_2$. Converter D also converts the signal appearing on line 82, which is an out-of-phase version of the signal on line 80, into an in-phase signal (with respect to line 82) at converter D output terminal 86. If the controlled current source $J_1$ comprises P-type devices for supplying current to the positive terminal 34, then the signal at output terminal 86 would be shifted to a level varying between $V_{cc}$ and $V_{cent}$ to allow the proper signal level into the control input of $J_1$. By proper levels, it is meant that saturation of the N-type or P-type devices will not occur. A capacitor $C_{12}$ connected across the converter D output terminals 84 and 86 serves to compensate the second feedback circuit 64 comprising amplifier E with input $V_d$, amplifier C, summing circuit S, converter D and controlled current sources $J_1$ and $J_2$. Capacitor $C_{12}$ also serves to reduce noise in the second feedback circuit 64 prior to the controlled current sources $J_1$ and $J_2$. Since the signals on the control lines 32 and 36 leading from the detector D outputs 86 and 84, respectively, to the control inputs of $J_1$ and $J_2$ are out of phase with respect to each other, capacitor $C_{12}$ can be connected between lines 32 and 36 rather than having two replacement capacitors, each having twice the capacitance of $C_{12}$, with one capacitor connected from line 32 to ground and the other capacitor connected from line 36 to ground.

Figure 7:
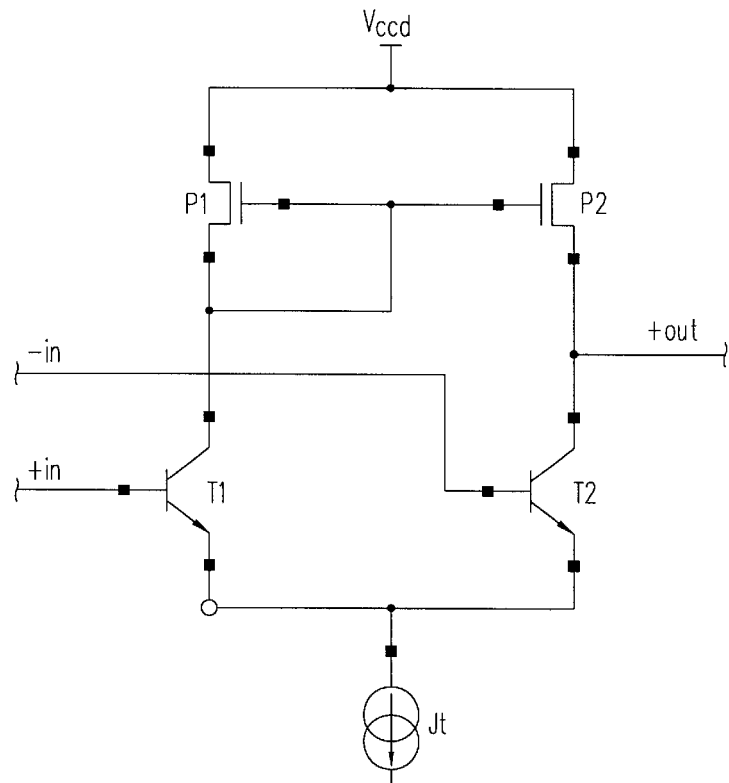
FIG. 7 is a circuit diagram of a differential transconductance amplifier with single output according to the preferred embodiment of the present invention.

FIG. 7 is a circuit diagram of a differential transconductance amplifier with a single-ended output as used for the amplifiers B, C and E described above with reference to FIG. 3. The design of differential transconductance amplifiers as described herein is well known to those skilled in the art. A positive phase input +IN and a negative phase input −IN feed into the bases of input devices $T_1$ and $T_2$, respectively. A tail current source $J_t$ is connected to the emitters of $T_1$ and $T_2$ providing a tail current $J_t$ to bias the amplifier into operation. FET devices $P_1$ and $P_2$ connected to the collectors of input devices $T_1$ and $T_2$, respectively, serve to supply a push-pull type output at the output terminal +OUT.

Figure 8:
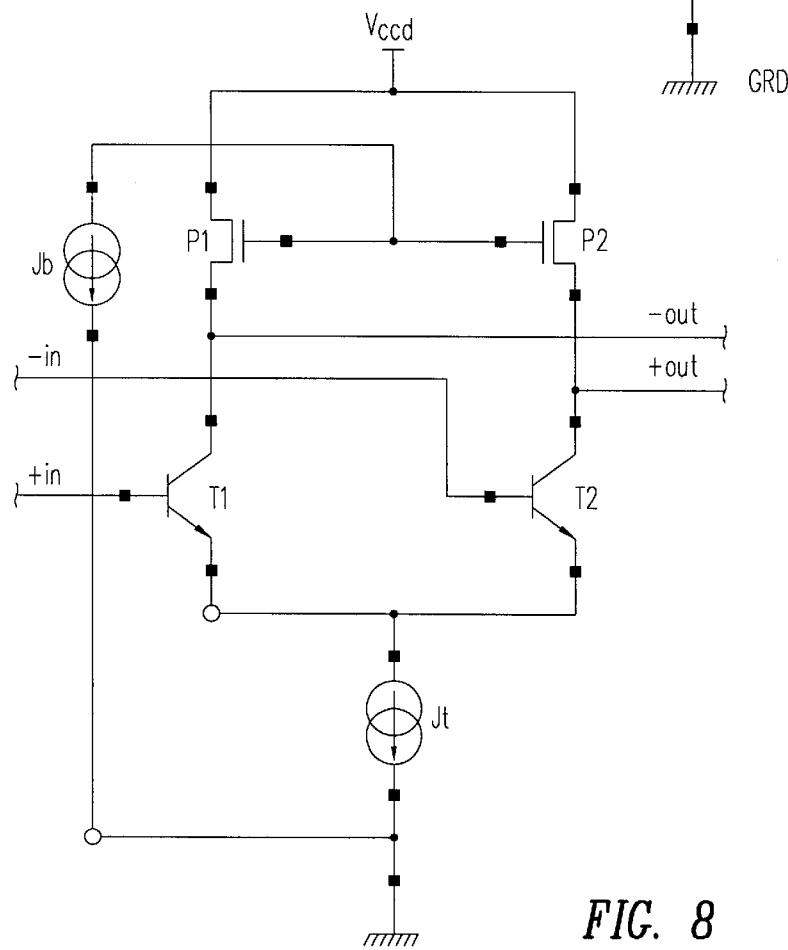
FIG. 8 is a circuit diagram of a differential transconductance amplifier with differential outputs according to the preferred embodiment of the present invention.

FIG. 8 is a circuit diagram of a differential transconductance amplifier with differential outputs as used for the summing circuit S described above with reference to FIG. 3. The design of differential transconductance amplifiers of the type described herein is well known to those skilled in the art. A positive phase input +IN and a negative phase input −IN feed into the bases of input devices $T_1$ and $T_2$, respectively. A tail current source $J_t$ is connected to the emitters of $T_1$ and $T_2$ providing a tail current $J_t$ to bias the amplifier into operation. FET devices $P_1$ and $P_2$ are biased into operation by a bias current from a bias current source $J_b$ connected to the drains of the FET devices $P_1$ and $P_2$. Differential output signals are produced at output terminals −OUT and +OUT connected to the drains of $P_1$ and $P_2$, respectively.

Figure 9:
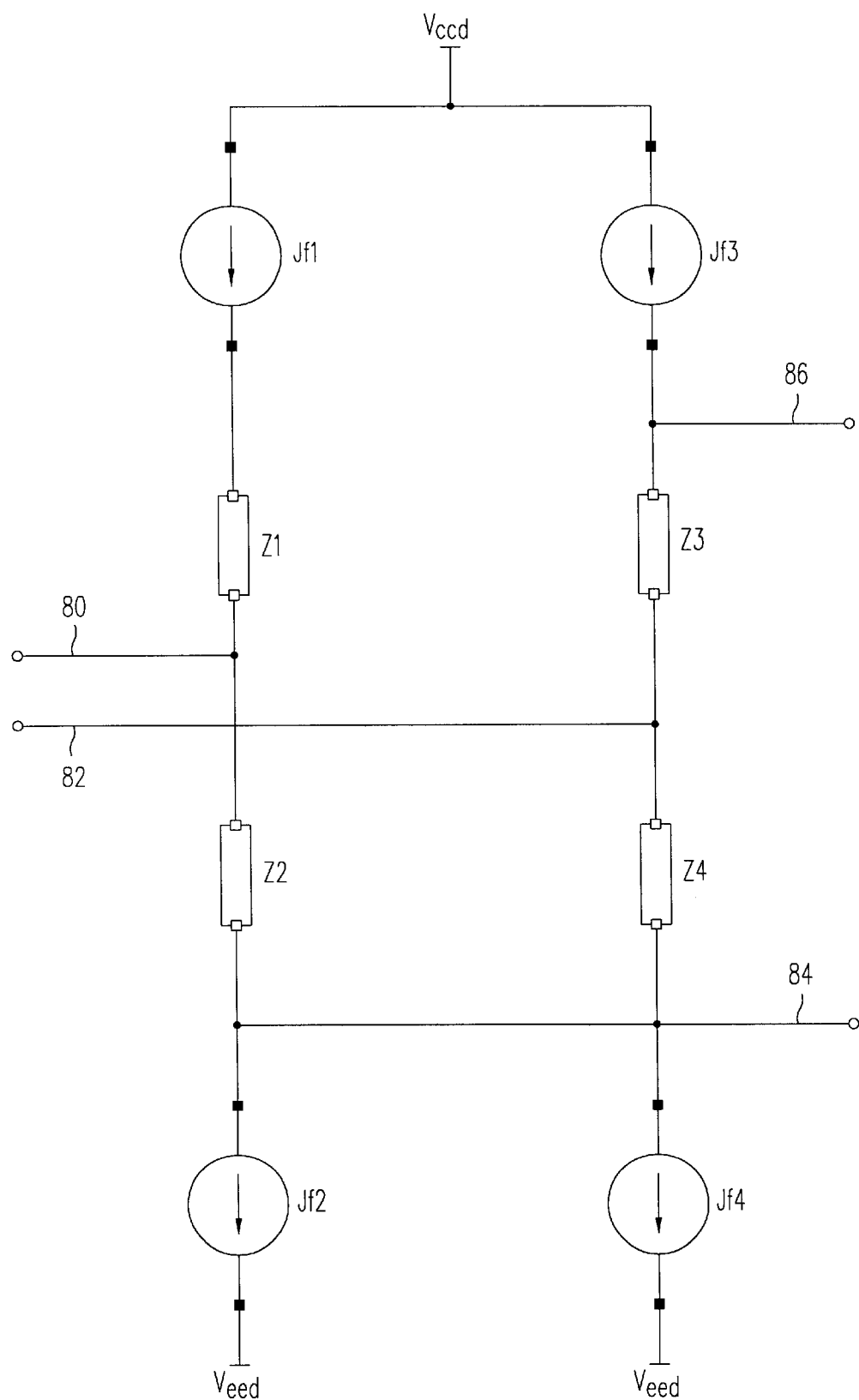
FIG. 9 is a circuit diagram of a differential level shifting circuit according to the preferred embodiment of the present invention.

FIG. 9 is a circuit diagram of a differential level shifting circuit as used for the converter D described above with reference to FIG. 3. There are two legs of this circuit, each leg having two fixed and equivalent current sources and an input impedance and an output impedance. The first leg of converter D comprises the series connection of a P-type fixed current source $J_{f1}$, an input impedance $Z_1$, an output impedance $Z_2$ and an N-type fixed current source $J_{f2}$. The first leg input line 80 connects to the junction connecting the input impedance $Z_1$ and the output impedance $Z_2$. The first leg output terminal 84 is connected to the junction connecting the output impedance $Z_2$ and the N-type fixed current source $J_{f2}$. The second leg of converter D comprises the series connection of a P-type fixed current source $J_{f3}$, an output impedance $Z_3$, an input impedance $Z_4$ and an N-type fixed current source $J_{f4}$. The second leg input line 82 connects to the junction connecting the input impedance $Z_4$ and the output impedance $Z_3$. The second leg output terminal 86 is connected to the junction connecting the output impedance $Z_3$ and the P-type fixed current source $J_{f3}$.

The voltage-biasing, voltage-sensing preamplifier disclosed herein provides differential amplification of the signal voltage produced by a voltage-biased magnetoresistive sensor. Both the biasing and amplification have inherent low-noise characteristics due to the circuit design. The MR element is controlled such that the average potential of the MR element is at or near the potential of the disk substrate (usually ground potential), and such that a short between any point along the MR element and ground of finite duration will not result in destructive currents capable of damaging or destroying the MR element.

Although some of the circuits in the above description of the present invention have used bipolar semiconductor devices, it is not considered an inventive step to substitute field effect transistor (FET) devices in these circuits.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited in scope only as specified in the appended claims.

We claim:

1. A voltage-biasing, voltage-sensing differential preamplifier, comprising:

a first subcircuit, comprising a voltage-sensing differential amplifier having a first input connected to a first terminal of an MR element and a second input connected to a second terminal of the MR element, said differential amplifier providing an amplified output signal of a voltage signal from the MR element; and a second subcircuit, connected across the first and second terminals of the MR element, comprising:

a first feedback circuit, connected to a node between series resistors connected across the first and second terminals of the MR element, said first feedback circuit providing a first error signal controlling a bias current across the MR element to hold an average potential across the MR sensor at a predetermined potential, and wherein said first feedback circuit further comprises:

an average-voltage amplifier B having a first input connected to the node between the series resistors connected across the first and second terminals of the MR element providing a measure of the average potential across the MR element;

a second input connected to a predetermined first reference voltage, and an output terminal connected in a feedback loop to the node between the series resistors connected across the first and second terminals of the MR element; and a second feedback circuit connected across the first and second terminals of the MR element, said second feedback circuit providing a second error signal controlling the bias current applied to the MR element to hold a bias voltage across the MR sensor at a predetermined voltage level.

2. The voltage-biasing, voltage-sensing differential preamplifier as recited in claim 1, wherein said average-voltage amplifier B is a differential transconductance amplifier.

3. A voltage-biasing, voltage-sensing differential preamplifier, comprising:

a first subcircuit, comprising a voltage-sensing differential amplifier having a first input connected to a first terminal of an MR element and a second input connected to a second terminal of the MR element, said differential amplifier providing an amplified output signal of a voltage signal from the MR element; and a second subcircuit, comprising:

a first feedback circuit connected to a node between series resistors across the first and second terminals of the MR element, said first feedback circuit providing a first error signal controlling a bias current across the MR element to hold a bias-voltage across the MR sensor at a predetermined voltage level; and a second feedback circuit connected across the first and second terminals of the MR element, said second feedback circuit providing a second error signal controlling the bias current applied to the MR element, said second feedback circuit further comprising:

an amplifier C having differential inputs including a first input connected to a positive terminal of the MR element, a second input connected to a negative terminal of the MR element, and an output providing a single-ended signal;

a reference amplifier E having differential inputs including a first input connected to a positive terminal of a differential reference voltage, a second input connected to a negative terminal of the differential reference voltage, and an output providing a single-ended signal;

a summing circuit S having differential inputs including a first input connected to the output of said reference amplifier E, a second input connected to the output of said amplifier C, and first and second differential outputs; and a converter D for providing control inputs to first and second controlled current sources providing current to the MR element, said converter D having a first input connected to the first differential output of the summing circuit S, a second input connected to the second differential output of the summing circuit S, a first output terminal connected to a control input of the first controlled current source, and a second output terminal connected to a control input of the second controlled current source.

4. The voltage-biasing, voltage-sensing differential preamplifier as recited in claim 3, wherein said amplifier C and said reference amplifier E are differential transconductance amplifiers.

5. The voltage-biasing, voltage-sensing differential preamplifier as recited in claim 3, wherein said summing circuit S is a differential transconductance amplifier.

6. The voltage-biasing, voltage-sensing differential preamplifier as recited in claim 3, wherein said converter D is a differential level shifting circuit.

7. The voltage-biasing, voltage-sensing differential preamplifier as recited in claim 6, wherein said converter D is a differential level shifting circuit further comprising:

a first leg comprising a series connection of a P-type fixed current source, an input impedance, an output impedance and an N-type fixed current source; and a second leg in parallel with the first leg, said second leg comprising a series connection of a P-type fixed current source, an output impedance, an input impedance and an N-type fixed current source.

* * * * *